United States Patent [19]

Mein

[11] Patent Number: 4,466,950

[45] Date of Patent: Aug. 21, 1984

[54] PROCESS FOR RECOVERING CESIUM FROM CESIUM ALUM

[75] Inventor: Peter G. Mein, LaSalle, Ill.

[73] Assignee: Carus Corporation, LaSalle, Ill.

[21] Appl. No.: 512,926

[22] Filed: Jul. 12, 1983

[51] Int. Cl.$^3$ ............................................. C01G 45/12
[52] U.S. Cl. .................................... 423/599; 423/179; 423/184; 423/199; 423/421; 423/600
[58] Field of Search ............... 423/599, 600, 499, 179, 423/184, 421, 199

[56] References Cited

U.S. PATENT DOCUMENTS

| | | | |
|---|---|---|---|
| 956,120 | 4/1910 | Machalske | 423/599 |
| 1,281,085 | 10/1918 | Shoeld | 423/599 |
| 2,481,455 | 9/1949 | Stenger | 423/499 |
| 2,504,130 | 4/1950 | Jaskowiak | 423/599 |
| 2,808,313 | 10/1957 | Fleischmann | 423/499 |
| 2,940,822 | 6/1960 | Carus et al. | 423/599 |
| 3,112,169 | 11/1963 | Berthold et al. | 423/117 |
| 3,207,571 | 9/1965 | Berthold | 423/600 |
| 3,489,509 | 1/1970 | Johnson | 423/499 |

FOREIGN PATENT DOCUMENTS

| | | | |
|---|---|---|---|
| 1323932 | 3/1963 | France | 423/499 |
| 0128454 | 4/1959 | U.S.S.R. | 423/421 |
| 0504704 | 5/1976 | U.S.S.R. | 423/421 |

OTHER PUBLICATIONS

J. J. Kennedy, *Chemical Reviews*, vol. 23 (1938), pp. 157–163.

Kirk–Othmer, *Encyclopedia of Chemical Technology*, vol. 5, 3rd Ed. (1979), pp. 327–338.

Vydrik et al., *Inorg. Mater.* (U.S.A.), vol. 8, No. 2 (Feb. 1972), pp. 366, 367.

*Primary Examiner*—Gary P. Straub
*Assistant Examiner*—Wayne A. Langel

[57] ABSTRACT

Cesium is recovered from cesium alum, $CsAl(SO_4)_2$, by a two-reaction sequence in which the cesium alum is first dissolved in an aqueous hydroxide solution to form cesium alum hydroxide, $CsAl(OH)_3$, and potassium sulfate, $K_2SO_4$. Part of the $K_2SO_4$ precipitates and is separated from the supernatant solution. In the second reaction, a water-soluble permanganate, such as potassium permanganate, $KMnO_4$, is added to the supernatant. This reaction forms a precipitate of cesium permanganate, $CsMnO_4$. This precipitate may be separated from the residual solution to obtain cesium permanganate of high purity, which can be sold as a product or converted into other cesium compounds.

10 Claims, No Drawings

PROCESS FOR RECOVERING CESIUM FROM CESIUM ALUM

BACKGROUND AND PRIOR ART

The field of this invention relates to the recovery of cesium from cesium-bearing minerals such as pollucite. More specifically, this invention relates to an improvement in such recovery processes wherein the cesium ore is extracted with sulfuric acid to obtain an extract containing cesium alum, $CsAl(SO_4)_2$ for further processing.

Processes for the recovery of cesium from pollucite and other cesium-containing minerals were reviewed by J. J. Kennedy in *Chemical Reviews*, Vol. 23 (1938), pages 157–163. More recent technical developments were summarized by R. A. Heindl, *Bureau of Mines Bulletin* 650, "Mineral Facts and Problems" (1970 Ed.), pages 527–534.

In one process which has undergone considerable development for commercial use, ground pollucite ore is leached with strong sulfuric acid to obtain an extract containing cesium alum, which is recovered by crystallization. The cesium alum is redissolved in water at an elevated temperature, and reacted with an alkaline earth metal hydroxide, such as $Ba(OH)_2$ or $Ca(OH)_2$, to form an aluminum hydroxide precipitate together with precipitated $BaSO_4$ or $CaSO_4$. Cesium sulfate remains in the supernatant solution from which it can be recovered and converted into other cesium compounds. See Kirk-Othmer, *Encylopedia of Chemical Technology*, Vol. 5, page 331 (3rd ed., 1979); U.S. Pat. Nos. 3,112,169 and 3,207,751; and *Chemical Reviews*, cited above, page 161.

Cesium alum is cesium aluminum sulfate hydrate. Its formula can be expressed as $CsAl(SO_4)_2.x12H_2O$, or as $Cs_2SO_4.Al_2(SO_4)_3.24H_2O$. The cesium alum as contained in the sulfuric acid extracts of pollucite is contaminated with other metal ions, such as rubidium, sodium, potassium, and iron. The crystallization of the cesium alum effects substantial purification, but the precipitate will contain at least trace amounts of other alums, such as rubidium alum, and other metal compounds such as iron sulfate. On redissolving the cesium alum precipitate, there is a need to separate not only the cesium from the aluminum but also from any other metal ions present as well as metal ions added in the precipitating agent.

While the cesium alum process is capable of producing cesium sulfate of relatively high purity, the process has proven to be difficult and expensive for commercial application. Therefore, there has been a recognized need for an improved process for recovering cesium from pollucite in a highly purified form. The need for such a process improvement has been emphasized in recent years by the increasing uses of cesium and cesium compounds, and by the projected expansion of these uses in anticipated applications. (See Heindl, above cited, pages 528–532.)

SUMMARY OF THE INVENTION

The process of the present invention can be regarded as an improvement in the traditional cesium alum process. The pollucite or other cesium-bearing mineral, is prepared in a finely-divided condition and extracted with concentrated sulfuric acid, following known prior art procedures. The cesium alum is recovered from the extract by crystallization. The cesium alum material may comprise a redissolved precipitate of cesium alum, prepared in accordance with well-known procedures.

In accordance with the improvement of the present invention, solid cesium alum is dissolved in an aqueous hydroxide solution having a hydroxide normality of from 0.5 to 4.0. The preferred hydroxide from the standpoint of cost is sodium hydroxide, but potassium hydroxide can also be used, or a mixture of sodium and potassium hydroxides. The hydroxide reaction forms cesium aluminum hydroxide, $CsAl(OH)_4$, and potassium sulfate, $K_2SO_4$. Part of the $K_2SO_4$ precipitates. The solids are separated from the supernatant solution, and a water-soluble permanganate is added to the supernatant. The preferred permanganate is potassium permanganate, $KMnO_4$. This reaction forms a precipitate of cesium permanganate, $CsMnO_4$. The $CsMnO_4$ precipitate is separated from the residual solution to obtain cesium permanganate of high purity.

The hydroxide and permanganate reactions, as described above, can both be carried out at moderate temperatures, for example, from 15° to 30° C. (essentially at room temperature). Heating or cooling is therefore not required. However, as an aid to the crystallization of the cesium permanganate, the solution can be warmed and cooled, if desired. A further advantage of the method is that the permanganate can be added in approximately equal molar proportions to the cesium in the solution. If cesium alum is added to a solution of potassium permanganate, or if potassium permanganate is added to a solution of cesium alum, a co-precipitate of cesium permanganate and cesium alum will result unless a substantial stoichiometric excess of the permanganate ion is used in relation to the cesium.

If the supernatant after formation of the cesium permanganate still contains any substantial amount of the cesium permanganate, this can be recovered by cooling the solution to a temperature at which substantially all of the cesium permanganate precipitates.

The fully precipitated cesium permanganate is recovered by filtration or centrifugation. Separation of the $CsMnO_4$ precipitate from the supernatant solution produces a cesium product of high purity, viz. above 98%. Cesium permanganate may be converted into other cesium compounds.

By reacting the cesium permanganate with a permanganate reducing agent, cesium carbonate ($Cs_2CO_3$) can be formed together with cesium delta manganese dioxide. In one procedure for carrying out this reduction, a slurry of the $CsMnO_4$ is formed in an aqueous alkaline solution containing the reducing agent, which conveniently may be a water-soluble organic compound such as methanol. The resulting cesium carbonate solution can be separated from the solid phase cesium delta manganese dioxide. The cesium carbonate may be recovered by evaporation and crystallization. Cesium can be removed from the cesium delta manganese dioxide by ion exchange using aqueous solutions of strong mineral acids or polyvalent metal salts of such acids. In this way, other commercially desirable inorganic salts of cesium may be easily obtained.

DETAILED DESCRIPTION

The preferred mineral for preparing the cesium alum is pollucite ore. However, other cesium-bearing minerals can be used as starting materials, although they are of lower cesium content, such as lepidolite and carnallite.

The content of cesium in crude pollucite ore varies over a considerable range, such as from 5 to 32 weight percent $Cs_2O$. Although not required for the purpose of the present invention, the cesium content of the starting material for the extraction may be upgraded by froth flotation to separate the pollucite from non-pollucite minerals. See Kirk-Othmer, *Encyclopedia of Chemical Technology*, Vol. 5, 327–338, at 330, (3rd ed., 1979).

The theoretical structure of pure pollucite is $Cs_2O \cdot Al_2O_3 \cdot 4SiO_2$. Natural pollucite, however, contains varying amounts of rubidium, potassium, and sodium in the pollucite crystal structure, the $Cs_2O$ being replaced by $Rb_2O$, $K_2O$, or $Na_2O$. Natural pollucite also contains some iron, usually in the form of an iron oxide. Crude pollucite ore is a heterogeneous material. It is therefore an advantage of the process of the present invention that no upgrading of crude pollucite ore is required.

The crude pollucite ore, upgraded pollucite, or other cesium-bearing mineral is crushed and ground to a state of fine subdivision. For example, particle size may be minus 200 mesh (American Standard Screen). It will be understood, however, that the exact particle size is not critical. A fine state of subdivision is advantageous to facilitate rapid contacting of the sulfuric acid with the cesium values to be solubilized.

The finely-divided cesium-bearing starting material is subjected to a leaching-type digestion with aqueous sulfuric ($H_2SO_4$) acid. For example, stainless steel or glass-lined reaction vessel equipped with an agitator can be used. The amount of $H_2SO_4$ present will be generally somewhat in excess of the minimum amount required to react with the cesium and other metals forming soluble sulfates.

The conditions for the extraction of the cesium in the form of a cesium alum solution, and the recovery of the cesium alum as a crystalline precipitate may be in accordance with any of the prior art processes or commercial processes which have been used to carry out these steps. For example, suitable processing conditions for these steps are described in U.S. Pat. Nos. 3,112,169 and 3,207,571. Further, relatively pure cesium alum is available as a commercial product, which can be purchased and used as a starting material for the process improvement of the present invention.

The cesium alum precipitate prepared from pollucite ore will contain silica. However, the cesium alum crystals will be of relatively large size, such as +100 mesh, while the silica particles will be of a much finer size, such as −200 mesh. The cesium alum crystals can therefore be retained on a 100 mesh sieve while the silica particles are washed through the sieve, thereby obtaining cesium alum of relatively low silica content.

In the first reaction of the process of the present invention, solid cesium alum is dissolved in an aqueous hydroxide solution. The hydroxide solution is preferably sodium hydroxide, but potassium hydroxide can also be used, or mixtures of sodium and potassium hydroxides. The normality of the solution is important. The hydroxide normality may range from 0.5 to 4.0. An optimized normality appears to be from about 2.0 to 3.0.

The hydroxide reaction converts the cesium alum as it dissolves to cesium aluminum hydroxide, $CsAl(OH)_4$, and potassium sulfate, $K_2SO_4$, with part of the $K_2SO_4$ precipitating. The precipitated solids are separated from the supernatant solution by a suitable procedure such as centrifugation or filtration.

The hydroxide reaction will be carried out at a high alkaline pH, such as a pH above 12. Typical pH's of the indicated normality are in the range from 13 to 14. Cesium alum is highly soluble at such strongly alkaline pH's even at moderate temperatures. The dissolving of the cesium alum and the reaction is therefore preferably carried out without appreciable heating or cooling of the solution, such as at a moderate temperature in the range from 15° to 30° C. Essentially room temperatures can therefore be used. However, if there is any reason for doing so, the reaction can also be carried out at higher temperatures, such as temperatures up to at least 80° C.

After separation of the solids, the supernatant solution is subjected to a permanganate precipitation reaction by adding a water-soluble permanganate to the supernatant. The permanganate ion reacts with the cesium to form a precipitate of cesium permanganate, $CsMnO_4$. Where the reaction is carried out at essentially room temperature, substantially all of the cesium permanganate will precipitate as formed. If higher temperatures are employed for this reaction, such as temperatures in the range from 30° to 80° C., the supernatant solution will contain recoverable amounts of the cesium permanganate. By cooling the solution to a temperature in the range from 15° to 20° C., substantially all of the cesium permanganate will precipitate. The total precipitate is then separated from the supernatant solution, such as by centrifugation or filtration. Since other metal ions and their associated anions remain in solution, the recovered cesium permanganate is of high purity. For example purities of 98% or greater can be obtained.

In reacting the solution of cesium aluminum hydroxide with the permanganate reaction, approximately equal molar portions of permanganate to cesium ion can be employed. The precipitate of cesium permanganate is formed on a quantitative, stoichiometric basis. However, to assure complete recovery of the cesium, a slight excess of the permanganate ion may be used, such as 1.1 to 1.2 moles of permanganate per mole of cesium. The excess permanganate will remain in the solution after separation of the cesium permanganate precipitate.

Any water-soluble permanganate salt can be used, since it is the permanganate ion which reacts with the cesium to form the precipitate. Potassium permanganate ($KMnO_4$) is the preferred reagent because of its availability and lower cost as compared with other alkali metal permanganates. The metal cation of the permanganate salt should not be one which forms an insoluble precipitate with sulfate. For this reason, alkaline earth metal permanganate such as calcium or barium are not desirable.

The conversion reactions can be represented by the following equations:

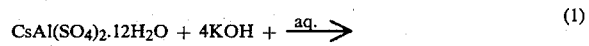

$$CsAl(SO_4)_2 \cdot 12H_2O + 4KOH + \xrightarrow{aq.} \qquad (1)$$

$$CsAl(OH)_4 + 2K_2SO_4 \downarrow + 14 H_2O$$

(partially precipitates)

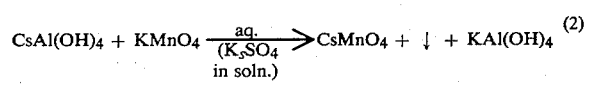

$$CsAl(OH)_4 + KMnO_4 \xrightarrow[\text{(K}_2\text{SO}_4 \text{ in soln.)}]{aq.} CsMnO_4 + \downarrow + KAl(OH)_4 \qquad (2)$$

The process improvement of the present invention is further illustrated by the following detailed examples:

EXAMPLE I

Preparation of Cesium Alum 6.12 kg pollucite (22.2% Cs, 2.55% Rb, 1.42% Na, 0.68% K, 9.42% Al, 25% Si) ball-milled to a particle size of minus 200 mesh were added to 7.9 kg 55% $H_2SO_4$ in a 76 l 3-neck round glass flask in a heating mantle. The reaction mixture was heated to 120° C. and moderately agitated. After 4 hours 30.6 kg boiling water were gradually added. After another hour the agitation was stopped and the reaction mixture was allowed to cool to room temperature within 48 hours. The pH of the reaction mixture was found to be 1.8. The reaction mixture containing large cesium alum crystals was put through a 100 mesh sieve. Most of the fine silica particles and the liquid was flushed through it retaining only the large cesium alum contaminated with only a little $SiO_2$ on the sieve. The cake was washed with 30 l water and obtained were 6.2 kg crude cesium alum. The crude cesium alum was air-dried to remove 9% moisture. The analysis of the air-dried product, consisting now of 5.64 kg, was as follows: 21.7% Cs, 0.38% Rb, 0.34% Na, 0.09% K and 4.78% Al. The cesium extraction yield at this point was 90%.

2.82 kg of the air-dried crude cesium alum were dissolved in 13 l water at 90° to 100° C. The solution was filtered hot through a medium-porosity heated filter funnel. The filtrate was allowed to cool to room temperature to bring about the crystallization of the cesium alum. The solids were separated from the liquid, the cake was washed with 1.5 l cold water and obtained were 2.94 kg wet purified cesium alum. The product contained 89% $CsAl(SO_4)_2 \cdot 12H_2O$ and 11% free water. The purity of the product was greater than 99%. Assuming the entire 5.64 kg crude cesium alum would have been crystallized, only half the quantity was used, the cesium yield at this point calculates to 90%. The material was air-dried and the analysis was as follows: 24.14% Cs, 0.17% Rb, 0.19% Na, 0.01% K, 0.005% Fe and 4.9% Al.

EXAMPLE II 150 g of the purified air-dried cesium alum were dissolved in 528 ml 2.5 N KOH at room temperature and reacted for 10 minutes. The $K_2SO_4$ which precipitated was separated by filtration through a course-porosity filter funnel and 41 g filter cake (0.67% Cs, 0.11% Rb, 0.0057% Na, 41% K) and 618 ml filtrate (58.1 g/l Cs, 0.34 g/l Rb, 0.046 g/l Na, 56.2 g/l K) were obtained. Then 45 g $KMnO_4$ were added to the filtrate. It was allowed to react for 12 hours (overnight) and then filtered through a course-porosity filter funnel. The filter cake was washed with 300 ml water, dried for several hours at 90° C. and obtained were 66.6 g $CsMnO_4$ (52.58% Cs, 0.051% Rb, 0.017% Na, 0.21% Al, 0.007% Fe, 21.74% Mn). The conversion of cesium from the $CsAl(SO_4)_2 \cdot 12H_2O$ to $CsMnO_4$ was 98%. The assay of the dried $CsMnO_4$ was 99.6%.

FURTHER PROCESSING STEPS

The cesium permanganate prepared as described above may be sold as a commercial product, or it may be further processed to prepare other commercially desirable cesium compounds. Such further processing involves an initial key reaction in which the cesium permanganate is reacted with a permanganate reducing agent. The products of the reduction is cesium carbonate, which is a commercial product, and also cesium delta manganese dioxide, from which cesium can be recovered. In preferred embodiments, therefore, such further processing is a desirable part of the present invention, and will now be described in further detail.

Cesium permanganate can function as a solid-phase oxidizing agent, and can be reacted with virtually any oxidizable compound. The oxidizable compounds function as reducing agents, and may be reacted in liquid, gaseous, or solid-phase reactions; such reducing agents include compounds containing carbon, hydrogen, or both carbon and hydrogen, which are oxidized to carbon dioxide and/or water by permanganate. While the reducing agent may be in the form of a gas, such as carbon monoxide, or hydrogen gas, a presently preferred procedure is to use a water-soluble reducing agent, and to dissolve the reducing agent in an aqueous alkaline solution for contacting with the solid-phase cesium permanganate. Such water-soluble reducing agents include starches, sugars, methanol, formic acid, formaldehyde, etc.

Using an aqueous slurry, the solid particles of the cesium permanganate can be dispersed in water containing the dissolved reducing agent. The pH of the aqueous phase can range from 4 to 12, but a moderately alkaline pH is preferred, such as pH 8.0 to 10.0. The temperature of the reduction is not highly critical, but may range, for example, from 20° to 100° C. The presently preferred temperature is from about 60° to 80° C.

The reduction reaction using methanol as the reducing agent and an aqueous alkaline solution can be represented by the following equation.

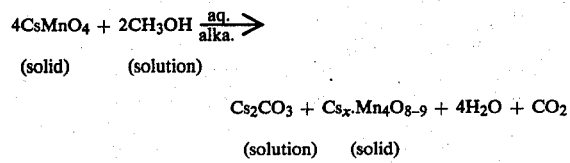

$$4CsMnO_4 + 2CH_3OH \xrightarrow[\text{alka.}]{\text{aq.}}$$

(solid)      (solution)

$$Cs_2CO_3 + Cs_x \cdot Mn_4O_{8-9} + 4H_2O + CO_2$$

(solution)      (solid)

In the above equation, the cesium delta manganese dioxide product is represented by a generalized formula. The cesium content represented by the letter "x" may vary from 0.8 to 2 moles per each 4 moles of manganese, and the oxygen content may correspondingly vary from 8 to 9 moles of oxygen. To maximize the amount of cesium carbonate obtained and to minimize the amount of cesium associated with the manganese dioxide is a desirable objective. However, the cesium can be recovered from the delta manganese dioxide by treating this product with acids or metal salt solution to replace the cesium in an ion exchange-type reaction. By employing a reaction pH of from 4 to 7, and a temperature of from about 20° to 90° C. delta manganese dioxide can be obtained containing less than 1 mole of cesium per each 4 moles of manganese.

The aqueous solution of the cesium carbonate is separated from the reaction solids, comprising the cesium delta manganese dioxide, by centrifugation or filtration. Thereafter, the cesium carbonate can be recovered in solid form by evaporation and crystallization procedures.

The cesium remaining associated with the manganese dioxide may be recovered by treating the delta manganese dioxide with an acid or polyvalent metal salt solution. The acid or polyvalent metal salt solution may be selected so that the anion will form a desired salt with the cesium, such as sulfuric acid or manganese sulfate to obtain cesium sulfate, hydrochloric acid or manganese chloride to obtain cesium chloride, nitric acid or manganese nitrate to obtain cesium nitrate. These reactions are represented by the following equations (A) and (B) in which a delta manganese dioxide containing 2 moles of cesium per 4 moles of manganese is reacted with sulfuric acid or manganese sulfate to obtain cesium sulfate as the product.

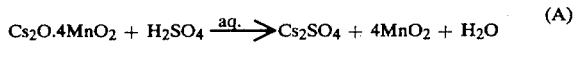

(A)

(B)

The reactions represented by the above equations are preferably carried out at temperatures of from about 20° to 50° C., but in certain embodiments temperatures up to 80° C. can be used. In the reaction of equation (A), since the acid is the reactant, the reaction will be carried out at an acid pH, usually a strong acid pH in the range from about 1 to 3. However, the reaction will proceed at any acid pH below 7.0. The reaction of equation (B) will also be at an acid pH below 7.0. The resulting manganate product will be in an acid form, which may be represented as: $MnO_2 \cdot xH_2O$.

In general, any strong acid can be used in the reaction of equation (A), including in addition to sulfuric acid, the other mineral acids (viz. nitric, hydrochloric, etc.). Any water-soluble polyvalent metal salt of a strong mineral acid can be substituted for the $MnSO_4$, such as cobalt, copper or nickel sulfate, nitrate, or chloride. Equations (A) and (B) can be used as a reaction sequence where not all of the cesium is recovered by reaction (A). It is believed to be preferred, however, to employ only reaction (B), which can result when used without reaction (A) in a substantially complete recovery of the cesium.

The cesium sulfate solution as obtained in reactions (A) and (B) can be separated from the manganate solids by centrifugation or filtration. The cesium sulfate or other cesium salt can then be recovered by evaporation and crystallization procedures.

In an alternative process embodiment, the $CsMnO_4$ can be reduced with a solid or gaseous reductant, and the $Cs_2CO_3$ leached from the converted solids by aqueous extraction, leaving the cesium delta manganese dioxide as the residue, which can be further processed as described above.

Further processing of cesium delta manganese dioxide is illustrated by the following examples.

EXAMPLE III 100 g $CsMnO_4$ (52.40% Cs, 21.66% Mn, 0.13% K, 0.07% Rb, 0.056% Al, 0.035% Na, 0.001% Fe) as prepared by the process of Example II were suspended in 400 ml $H_2O$ in a 1 liter beaker. The suspension was stirred and its pH adjusted to 13 with 6.9 g CsOH in 14 ml water. It was heated to 60° C. and 12.7 g $CH_3OH$ in 12.7 ml water was gradually added within 45 minutes. The reaction mixture was stirred and kept at 60° C. for another 10 min. or until all seven-valent manganese was reduced to four-valent manganese. If the reduction of the $CsMnO_4$ is carried out at room temperature, the reduction process will be extended. The solids were separated from the liquid by filtration through a medium-porosity buchner filter funnel, it was washed with 50 ml water, and 146 g filter cake (17.9% Cs, 14.85% Mn, 0.58% Rb) and 360 ml filtrate and wash (65.6 g/l Cs, 0.06 g/l Rb, 0.05 g/l K, 0.002 g/l Na, 0.0006 g/l Mn) were obtained. The cesium extraction from the $CsMnO_4$ is at this point 50% and the molar ratio Mn:Cs in the filter cake is as 1:0.5.

The $Cs_2CO_3$ in the filtrate can be recovered as such or be converted into any suitable cesium compound by addition of the corresponding acid followed by evaporation and crystallization.

The 146 g filter cake were suspended in 200 ml water and pH-adjusted to 0.6 with 27.3 g 50% $H_2SO_4$. The reaction mixture was stirred for several hours, then filtered through a medium-porosity filter funnel. It was washed with 100 ml water, and 106 g filter cake (20.4% Mn, 5.92% Cs) and 350 ml filtrate containing 73 g/l $Cs_2SO_4$ were obtained, which is another 38% cesium extraction. The total extraction of cesium from the $CsMnO_4$ was 88% leaving 12% in the $MnO_2$. Higher acid concentration did not improve the extraction yields significantly. The filtrate was pH-adjusted to 7 with a solution containing 79.7 g/l $Cs_2CO_3$. Any soluble two-valent manganese left was oxidized with a suitable oxidant ($CsMnO_4$, $H_2O_2$) precipitated as manganese oxide and removed by filtration. The filtrate was evaporated to dryness. The $Cs_2SO_4$ obtained was 99.4% pure.

EXAMPLE IV 100 g $CsMnO_4$ (99.4% $CsMnO_4$, 21.68% Mn, 52.46% Cs) as prepared by the process of Example II were suspended in 400 ml $H_2O$ in a liter beaker. The suspension was stirred and heated to 65° C. and 12.7 g $CH_3OH$ in 12.7 ml water were gradually added within 45 minutes. The reaction mixture was stirred and kept at 60° C. for another 3 hours or until all seven-valent manganese is reduced to four-valent manganese. (Due to the open beaker some water evaporates). If the reaction is carried out at room temperature the reduction process will be extended. The solids were separated from the liquid by filtration through a medium-porosity buchner filter funnel, it was washed with 100 ml water, and 110 g filter cake (15.31% Cs, 0.08% Rb, 0.033% Na, 0.032% K, 0.016% Fe, 19.85% Mn) and 460 ml filtrate and wash (77.54 g/l Cs, 0.23 g/l Rb, 0.0014 g/l Na, 0.043 g/l K, 0.0005 g/l Mn) were obtained. The cesium extraction from the $CsMnO_4$ is at this point 68% and the molar ratio Mn:Cs in the filter cake is as 1:0.32.

The $Cs_2CO_3$ in the filtrate can be recovered as such or be converted into any suitable cesium compound by addition of the corresponding acid followed by evaporation and crystallization.

The 110 g filter cake were suspended in 220 ml of a solution containing 68.2 g/l $MnSO_4$. The reaction mixture was stirred and heated and kept at 50° C. for 10 hours. It was filtered through a medium-porosity buchner filter funnel, washed with 100 ml water and 155 g filter cake (17.6% Mn, 0.17% Cs) and 260 ml filtrate and wash (63.7 g/l Cs, 0.24 g/l Rb, 0.03 g/l Na, 0.032 g/l K) were obtained.

Any soluble two-valent manganese left was oxidized with a suitable oxidant ($CsMnO_4$, $H_2O_2$), precipitated as manganese oxide and removed by filtration. Other manganese salts can be used in this ion-exchange reaction such as $MnCl_2$, $MnNO_3$, $MnCO_3$, etc. to obtain the cesium salt needed. The filtrate was evaporated to dryness and 22.7 g $Cs_2SO_4$ (72.87% Cs, 0.11% Rb, 0.008% K, 0.0006% Na) were obtained. The extraction of cesium from the $CsMnO_4$ was 68% as $Cs_2CO_3$ and 31.5% as $Cs_2SO_4$ which totals 99.5%. The purity of the product was higher than 99.7%.

In the recovery of cesium from the cesium containing delta $MnO_2$, any compounds known to ion exchange alkali in alkali-containing delta $MnO_2$'s can be used. As for example compounds of zinc, calcium, barium, copper, cobalt, nickel, etc. being polyvalent metal salts of strong mineral acids.

I claim:

1. A process for recovering cesium from cesium alum, $CsAl(SO_4)_2$, comprising:
   (a) dissolving solid cesium alum in an aqueous hydroxide solution selected from the class consisting of aqueous sodium and/or potassium hydroxides, said solution having a hydroxide normality of from 0.5 to 4.0;
   (b) forming cesium aluminum hydroxide, $CsAl(OH)_4$, and potassium sulfate, $K_2SO_4$ with part of the $K_2SO_4$ precipitating;
   (c) separating the solids from the supernatant solution;
   (d) adding a water-soluble permanganate to the supernatant solution;
   (e) forming a precipitate of cesium permanganate, $CsMnO_4$; and
   (f) separating the $CsMnO_4$ precipitate from the residual solution to obtain cesium permanganate of high purity.

2. The method of claim 1 in which said permanganate is added in approximately an equal molar proportion to the cesium in said solution.

3. The process of claim 1 in which said hydroxide is sodium hydroxide and said permanganate is potassium permanganate ($KMnO_4$).

4. The process of claim 1 in which said supernatant solution contains salts of other alkali metals besides cesium.

5. The method of claim 1 in which said permanganate is potassium permanganate ($KMnO_4$) which is added in approximately equal molar proportions to the cesium in said supernatant solution, which solution also contains salts of other alkali metals besides cesium.

6. A process for recovering cesium from cesium alum, $CsAl(SO_4)_2$, comprising:
   (a) dissolving solid cesium alum in an aqueous hydroxide solution selected from the class consisting of aqueous sodium and/or potassium hydroxides, said solution being at a temperature of from 15° to 30° C. and having a hydroxide normality of from 2.0 to 3.0;
   (b) forming cesium aluminum hydroxide, $CsAl(OH)_4$, and potassium sulfate, $K_2SO_4$ with part of the $K_2SO_4$ precipitating;
   (c) separating the solids from the supernatant solution;
   (d) adding a water-soluble permanganate to the supernatant solution at a temperature of from 15° to 30° C.;
   (e) forming a precipitate of cesium permanganate, $CsMnO_4$;
   (f) separating the $CsMnO_4$ precipitate from the residual solution to obtain cesium permanganate of high purity;
   (g) reacting the separated $CsMnO_4$ with a permanganate reducing agent to obtain a cesium carbonate ($Cs_2CO_3$) solution and solid delta manganese dioxide ($Cs_xMn_4O_{89}$ wherein x=0.8 to 2); and
   (h) separating the cesium carbonate solution from the cesium delta manganese dioxide.

7. The process of claim 6 in which said hydroxide is sodium hydroxide and said permanganate is potassium permanganate ($KMnO_4$) and said reducing agent is methanol.

8. The process of claim 6 in which the separated cesium delta manganese dioxide is reacted with an aqueous solution of a strong mineral acid to exchange the cesium for the hydrogen and obtain an aqueous solution of a cesium salt of the strong mineral acid.

9. The process of claim 6 in which the separated cesium delta manganese dioxide is reacted with an aqueous solution of a polyvalent metal salt of a strong mineral acid to exchange the polyvalent metal for the cesium and obtain an aqueous solution of the cesium.

10. A process for recovering cesium from cesium alum, $CsAl(SO_4)_2$, comprising:
    (a) dissolving solid cesium alum in an aqueous hydroxide solution selected from the class consisting of aqueous sodium and/or potassium hydroxides, said solution having a temperature of from 15° to 30° C. and a hydroxide normality of from 3.0 to 4.0;
    (b) forming cesium aluminum hydroxide, $CsAl(OH)_4$, and potassium sulfate, $K_2SO_4$, with part of the $K_2SO_4$ precipitating;
    (c) separating the solids from the supernatant solution;
    (d) adding potassium permanganate to the supernatant solution;
    (e) forming a precipitate of cesium permanganate, $CsMnO_4$; and
    (f) separating the $CsMnO_4$ precipitate from the residual solution to obtain cesium permanganate of high purity.

* * * * *